(No Model.)

J. R. BROUGHT.
VEHICLE SHAFTS.

No. 465,690. Patented Dec. 22, 1891.

WITNESSES
Walter Allen
F. W. Barnacle

INVENTOR
Jonathan R. Brought.
by Herbert W. T. Jenner. Attorney

THE NORRIS PETERS CO., PHOTO-LITHO., WASHINGTON, D. C.

UNITED STATES PATENT OFFICE.

JONATHAN R. BROUGHT, OF MOJAVE, CALIFORNIA.

VEHICLE-SHAFTS.

SPECIFICATION forming part of Letters Patent No. 465,690, dated December 22, 1891.

Application filed May 19, 1891. Serial No. 393,280. (No model.)

*To all whom it may concern:*

Be it known that I, JONATHAN R. BROUGHT, a citizen of the United States, residing at Mojave, in the county of Kern and State of California, have invented certain new and useful Improvements in Vehicle-Shafts; and I do hereby declare the following to be a full, clear, and exact description of the invention, such as will enable others skilled in the art to which it appertains to make and use the same.

This invention relates to the shafts of vehicles; and it consists in the novel construction and combination of the parts hereinafter fully described and claimed, whereby the shafts may be readily uncoupled from the back-pad and belly-band.

Figure 1:
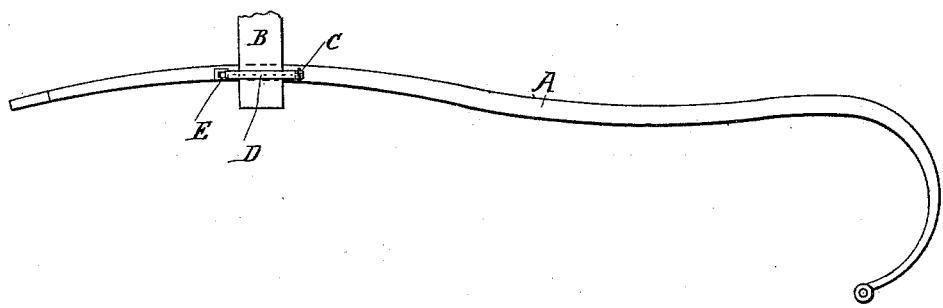
Figure 2:
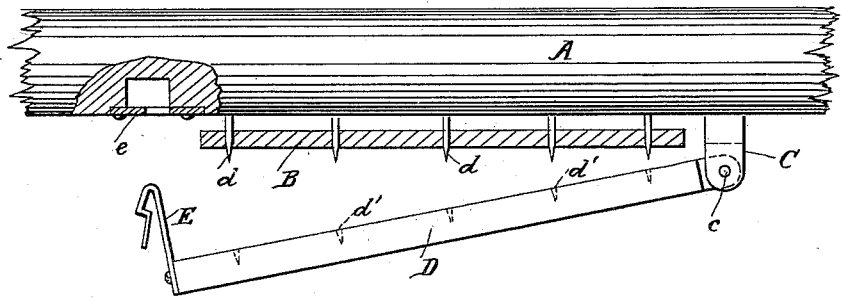

In the drawings, Figure 1 is a side view of the shafts of a vehicle provided with a fastening attachment according to this invention. Fig. 2 is a detail plan view from above of a portion of one of the shafts and the fastening attachment drawn to a larger scale.

A are the vehicle-shafts, which are of any approved construction and form.

B is the end of a strap or band, which is adapted to be connected to the back-pad and belly-band. The back-pad and belly-band are of any approved construction and have the band ends B secured to them on each side, so that the shafts may be supported and connected to the animal by fastening them to the said band ends B. The tugs or traces are preferably used in connection with an ordinary breast-strap, and are connected to the vehicle in the usual manner. The breaching-band may be dispensed with.

C is a double eye secured to each shaft A. D is a bar hinged at one end to the double eye by the pin *c*. E is a spring-catch secured to the other end of the bar D, and *e* is a socket let into the shaft for the said spring-catch to engage with. Spikes *d* project from the shaft behind the bar and engage with holes *d'* in the bar D when the catch is in the socket. The end B of each strap is placed upon the spikes and the bar D is turned upon its pivot and pressed against the strap until the spikes are forced through it and the spring-catch engages with the socket and holds the strap end secure.

The shafts are readily detached from the harness of the animal by pressing the spring-catches and turning the bars on their pivots to free the ends of the straps.

What I claim is—

The combination, with the shafts having perforated socket-plates *e* let into them, of the double eyes secured to the shafts, the spikes projecting from the shafts, the bars pivoted at one end to the double eyes, and the spring-catches E, secured to the free ends of the said bars and adapted to engage automatically with the said socket-plates when the bars are pressed upon the spikes, substantially as and for the purpose set forth.

In testimony whereof I affix my signature in presence of two witnesses.

JONATHAN R. BROUGHT.

Witnesses:
G. W. TODD,
W. W. BROWN.